May 17, 1932.  G. ALMQUIST  1,859,191
PIPE FORM STRIPPER
Filed March 7, 1930  6 Sheets-Sheet 1

Gus Almquist, INVENTOR

BY Victor J. Evans ATTORNEY

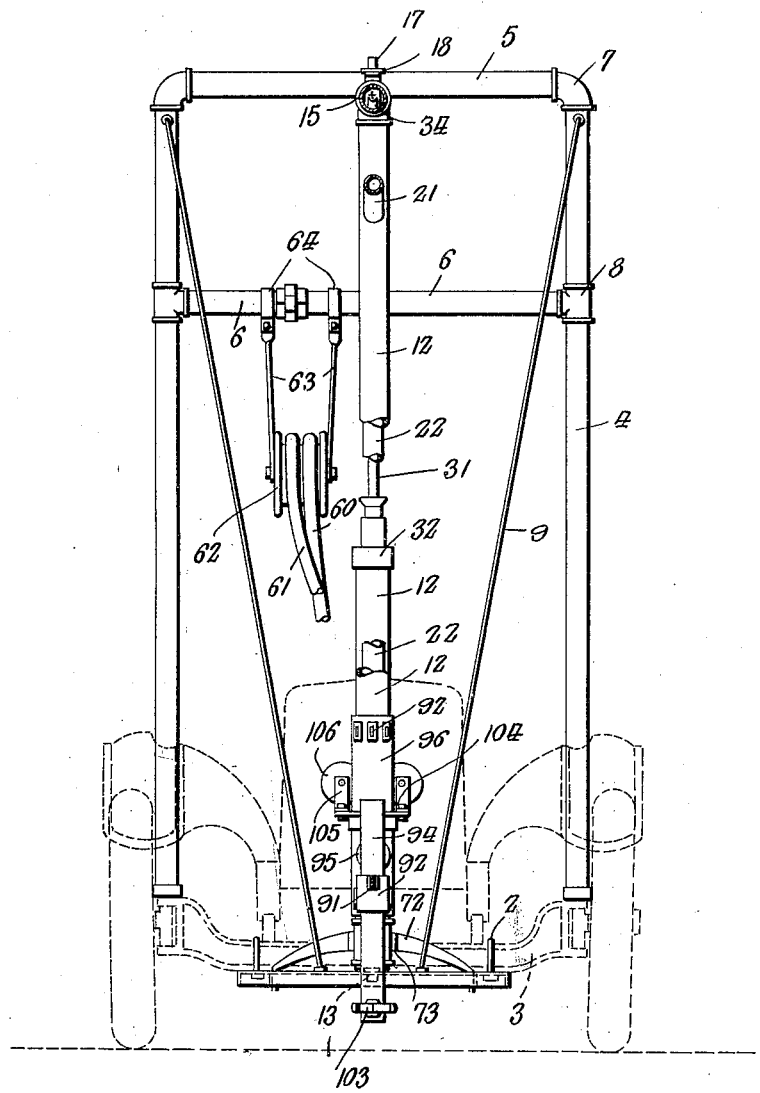

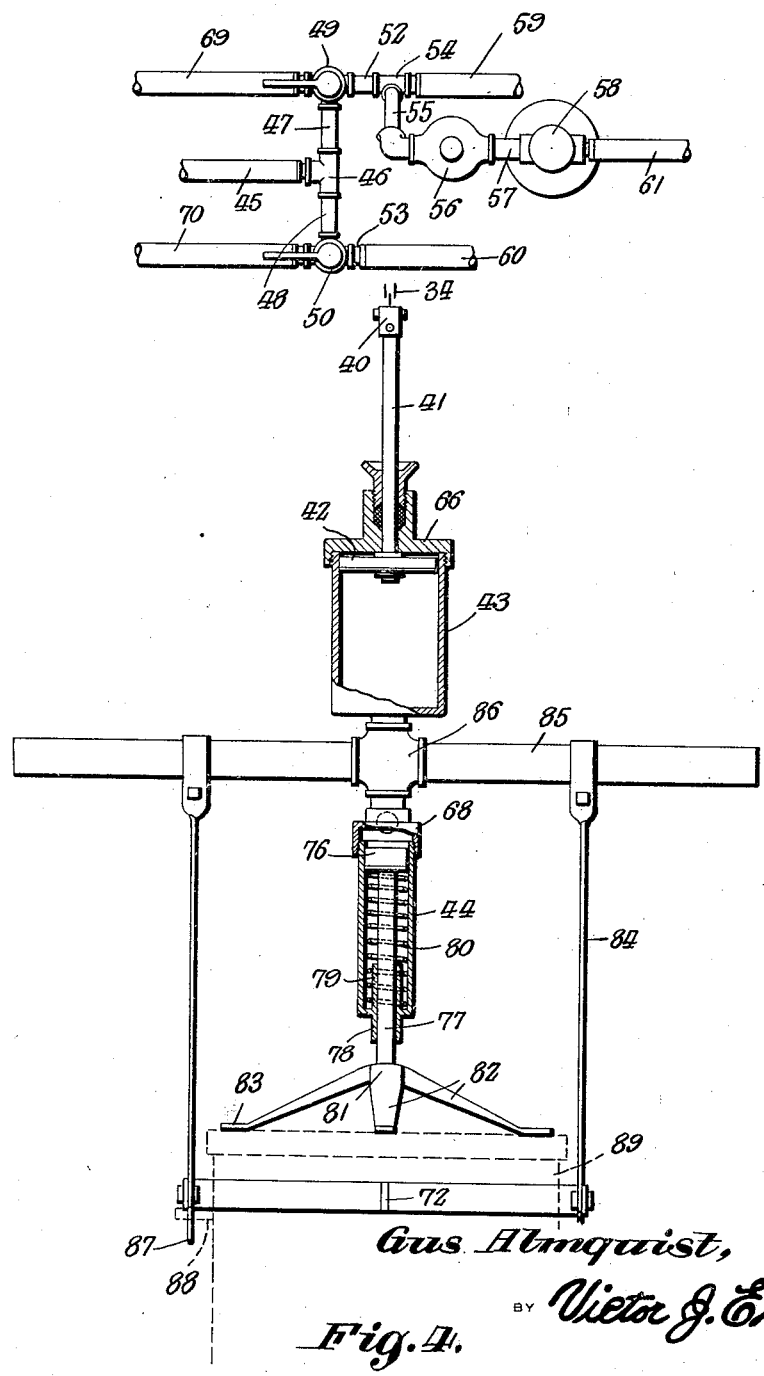

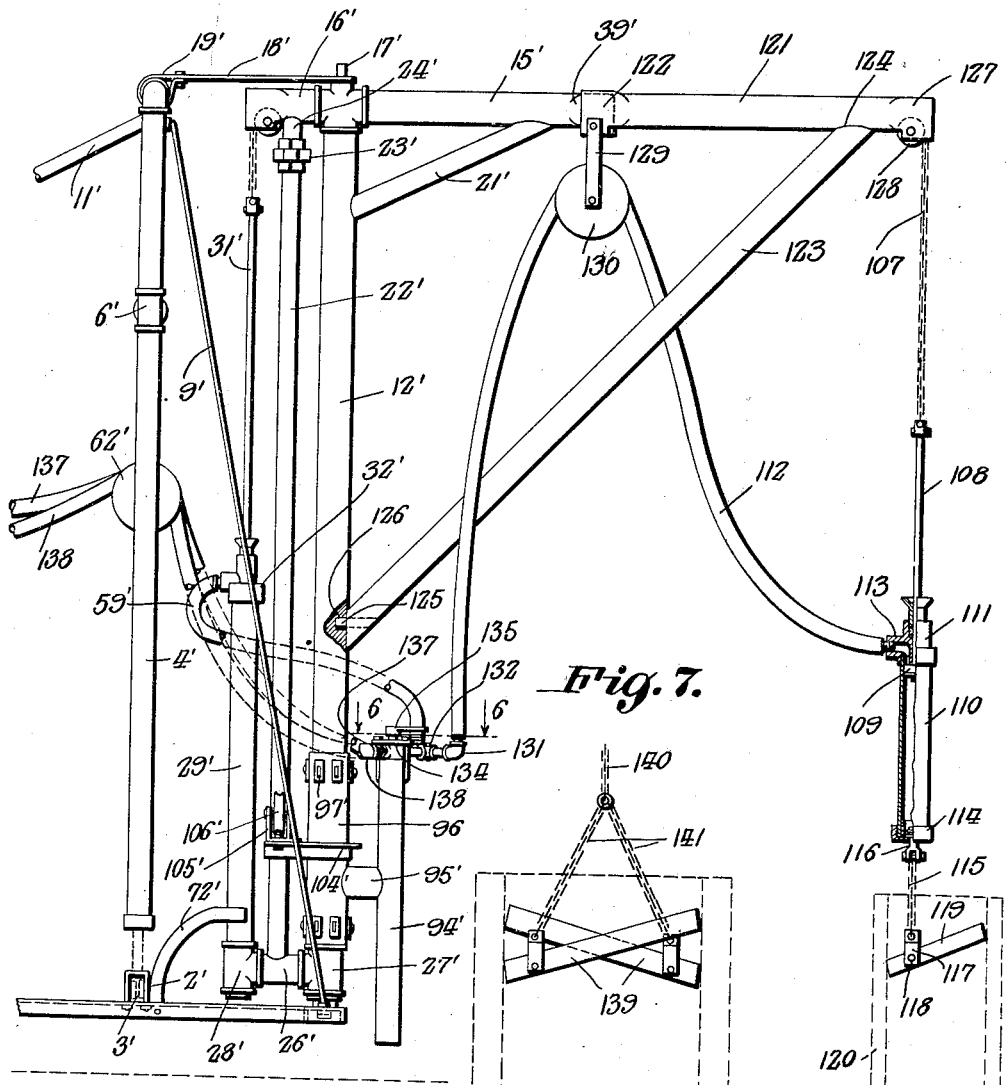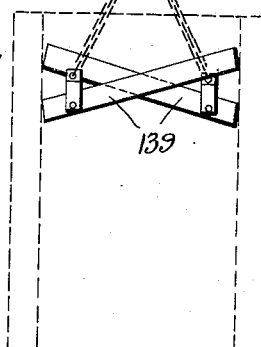

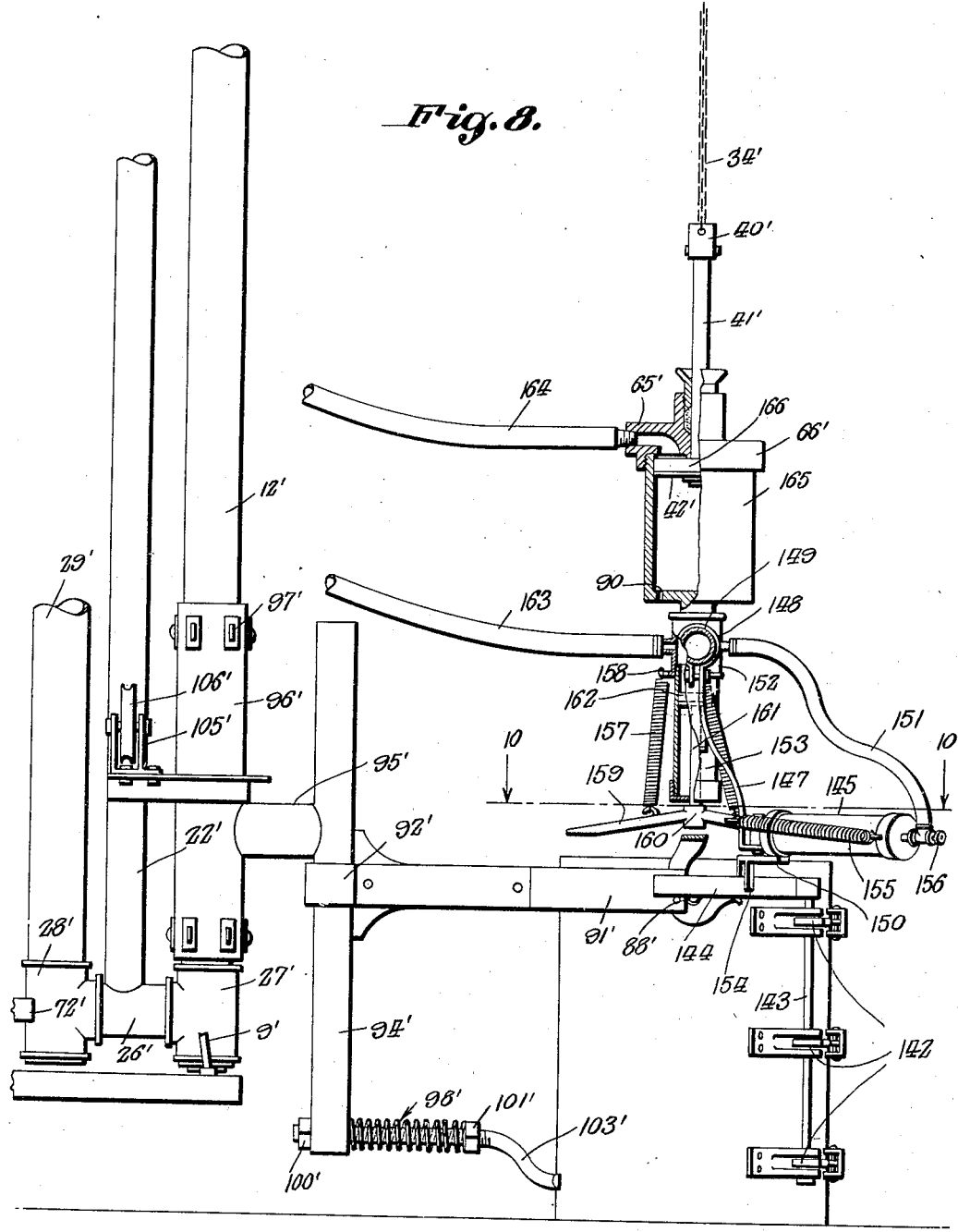

May 17, 1932.  G. ALMQUIST  1,859,191
PIPE FORM STRIPPER
Filed March 7, 1930  6 Sheets-Sheet 6
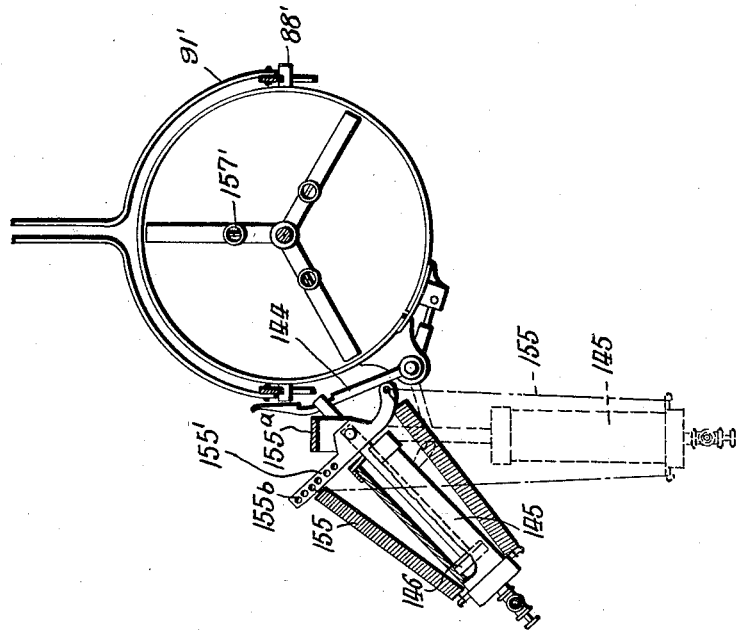
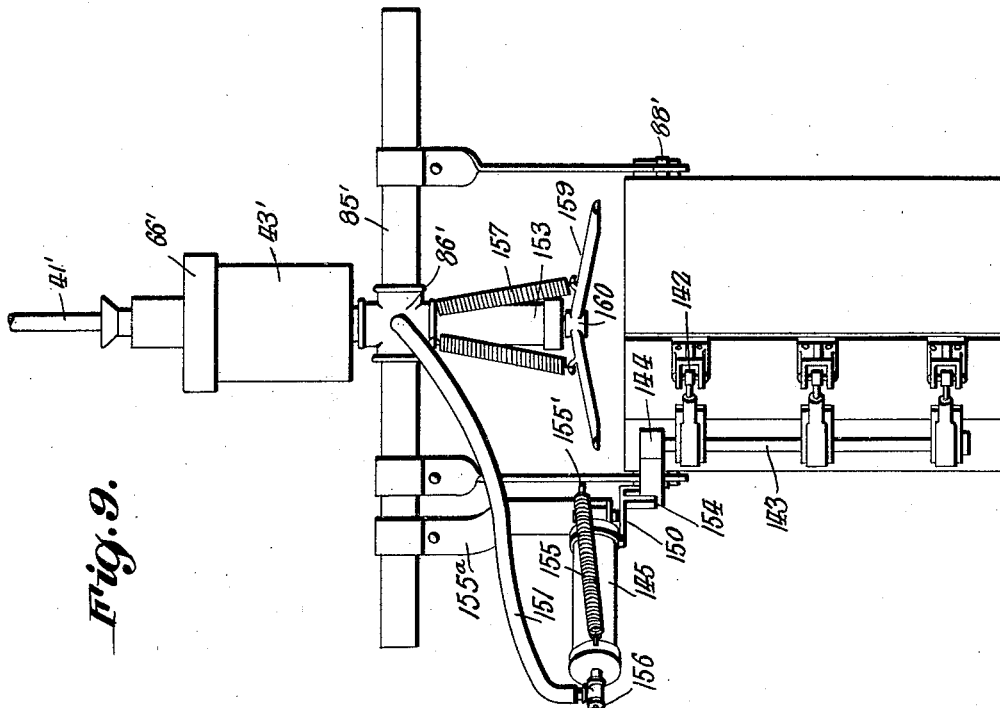
Gus Almquist, INVENTOR
BY Victor J. Evans ATTORNEY Patented May 17, 1932

1,859,191

UNITED STATES PATENT OFFICE

GUS ALMQUIST, OF PERRIS, CALIFORNIA

PIPE FORM STRIPPER

Application filed March 7, 1930. Serial No. 434,149.

This invention relates to an apparatus for stripping concrete pipes, after they have been molded and for lifting and transferring the finished pipe onto a truck by which it may be transported to a place where it is to be used or to a place of storage for future use, and the invention contemplates the provision of an apparatus for this purpose which may be conveniently installed upon an automobile or motor truck and operated by the engine by which the automobile or truck is driven.

Another object of the invention is to provide an apparatus for the purpose stated which may be adapted to a pipe molding form after the concrete has been poured into the form and has set, and whereby the form may be elevated, carrying with it the finished pipe, and, as stated above, delivered onto a truck.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a vertical transverse sectional view taken substantially on the line 2—2 of Figure 1, looking in the direction indicated by the arrows.

Figure 3 is a top plan view illustrating control valves for controlling the supply of water, under pressure, through the medium of which the component parts of the apparatus are operated.

Figure 4 is a view partly in front elevation and partly in transverse section, illustrating a portion of the apparatus.

Figure 5 is a view similar to Figure 1, illustrating a modification of the invention.

Figure 6 is a horizontal sectional view taken substantially on the line 6—6 of Figure 5, looking in the direction indicated by the arrows.

Figure 7 is a detail view in elevation illustrating a modification of the pipe lifting means of the apparatus.

Figure 8 is a view in side elevation of a portion of the apparatus illustrating a modified embodiment.

Figure 9 is a front elevation of the structure shown in Figure 8.

Figure 10 is a horizontal sectional view taken on the line 10—10 of Figure 8, looking in the direction indicated by the arrows.

Figure 1:
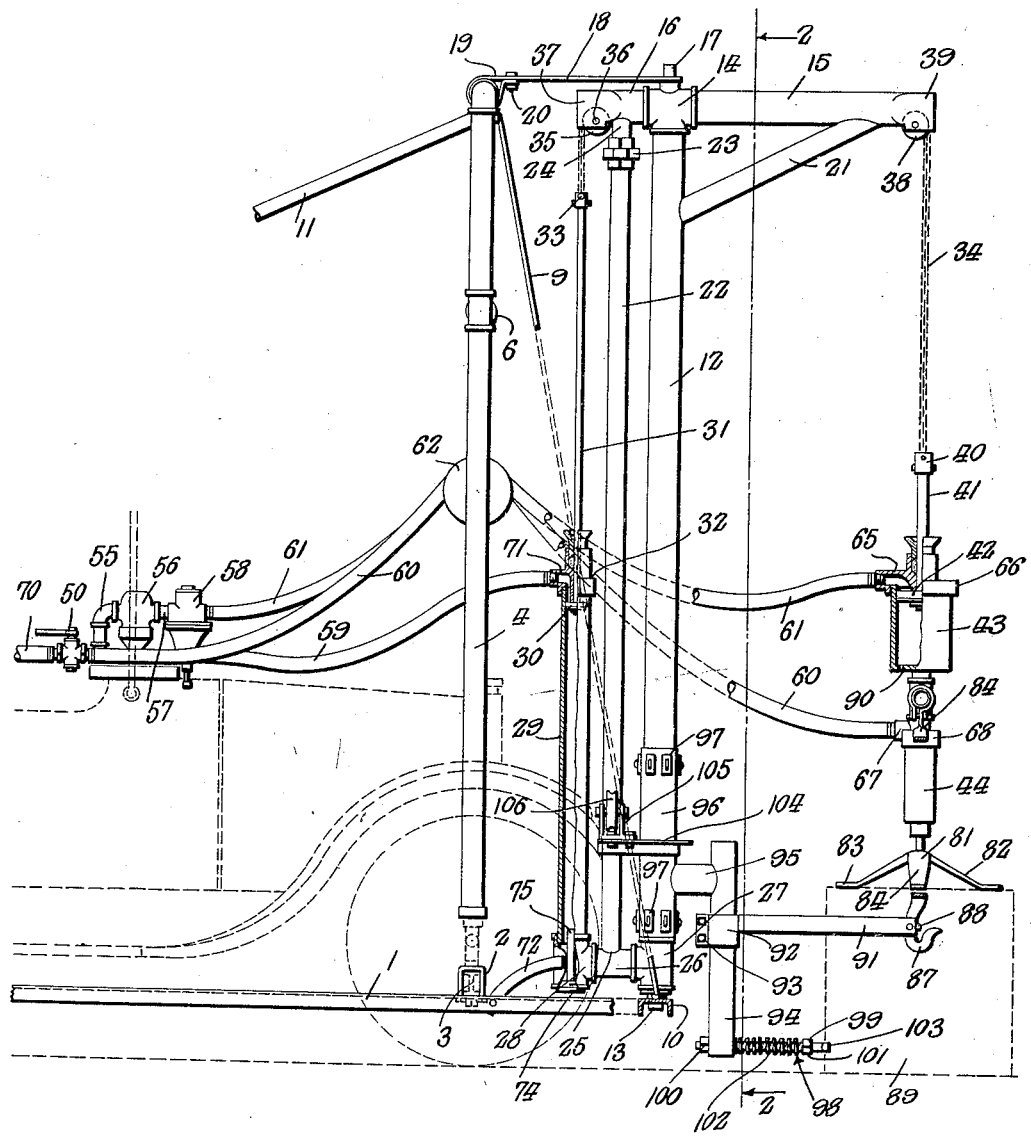
Figure 1 is a view in side elevation of the apparatus embodying the invention.

In order that the apparatus, embodying the invention, may be installed upon an automobile or motor truck, and referring more particularly to Figures 1 to 4 inclusive, of the drawings, a base frame structure 1 is mounted, by U-bolts 2, upon the under side of the front and rear axles of the automobile, the front axles 3, however, being the only axle shown inasmuch as the apparatus is mounted entirely at the front of the automobile upon which it is installed, and this frame 1 extends somewhat forwardly beyond the front axle 3, and a frame structure is provided, comprising tubular uprights 4, a top cross piece 5, and an intermediate cross piece 6, both of tubular form and connected respectively to the upper ends of of the uprights 4 by elbows 7, and to the uprights 4 by T-joints 8. This frame structure is braced by brace rods 9 which are secured at their upper end to the upper ends of the uprights 4 and at their lower ends are anchored to th front cross member 10 of the frame 1. A brace rod 11 is secured at its upper end to the intermediate portion of the cross piece 5 of the said frame and connected at its rear end, in any suitable manner to the rear portion of the body of the automobile or truck.

The apparatus includes, in its structure, a crane which includes a tubular upright indicated by the numeral 12 and mounted at its lower end by a bolt 13, upon the front cross member 10 of the frame. A T-joint 14 is fitted to the upper end of the upright 12 and a crane arm 15 is fitted into the forward branch of the T-joint, and a shorter arm 16 is fitted into the rear branch of the joint, and in order that this upright 12 may be braced with respect to the frame 4, a stud 17 is formed upon the upper side of the joint 14, and a brace bar 18 is apertured at one end and fitted over this stud, the other end of the bar being bent to provide a collar portion 19 which is fitted about the intermediate portion of the cross member 5 of the upright frame structure, and closed to grip the said cross piece by a nut and bolt indicated by the numeral 20. The crank arm 15 is braced with respect to the upright 12 by means of a polygonal brace 21 and riveted at its ends to the under side of the arm 15, and the forward side of the upright 12. The numeral 22 indicates another upright which is connected by a coupling 23 with a nipple 24 formed at the under side of the arm 16 of the crane, and the lower end of this upright 22 is welded as at 25 to a nipple 26 which is threaded into a T-coupling 27 fitted to the lower end of the upright 12, and to a similar coupling head, which is indicated by the numeral 28 and which is fitted to the lower end of a cylinder 29, which extends in upright position from the coupling head, and in which is slidably mounted a piston, the head of which is indicated by the numeral 30, and the stem by the numeral 31, and the said stem of the piston extends upwardly through a head 32 which is fitted to the upper end of the cylinder 29, and, to the upper end of the piston stem 31 there is connected, by a coupling 33, a chain 34 which is led over a pulley 35 mounted upon a spindle 36 in turn mounted at its ends in openings in a housing 37 formed at the rear end of the arm 16.

This chain 34 is led through the arm 16, joints 14, and arm 15, and about a pulley 38 mounted in a housing 39 similar to the housing 37. The other end of the chain is connected by a coupling 40 similar to the coupling 33 to the upper end of the rod 41 of a piston 43 which operates in a cylinder 43 in the manner in which the pistons 30 and 42 function, and which will be presently more specifically described.

The supply of water, under pressure, to the cylinders 29 and 43, and also to a cylinder 44, which is associated with the cylinder 43, is by way of a supply pipe 45 which leads from any suitable source of water, under pressure, this pipe or supply main, being connected with a T-coupling 46 into the branches of which are fitted nipples 47 and 48 in turn placed in communication with valve casings, indicated respectively by the numerals 49 and 50, the valves being manually operable. Nipples 52 and 53 are connected to other branches of the valve casings 49 and 50 respectively, and a T-coupling 54 is fitted to the nipple 52 and a pipe 53 leads from one branch of this T-coupling to the casing of a dirt collector 56, a nipple 57 being connected with the outlet of the dirt collector 56, and with a pressure regulator, which is indicated by the numeral 58. A pipe 59 is connected to the other branch of the T-coupling 54, and a flexible tube 60 is connected with the nipple 53 and the pipe 59 and a tube 61 which is connected with the outlet of the pressure regulator 58, are led over a pulley 62 supported by depending arms 63, connected at their upper ends to collars 64 which are fittted to and in clamping engagement with the cross piece 6.

The tubes 60 and 61 are led from the valve casing 50 and pressure regulator 58, respectively, and the said tube 60 is connected at its delivery end to an intake branch 65 provided upon a closure head 66 for the cylinder 43, through which closure head the piston rod 41 is slidably fitted, this arrangement, providing of course for the delivery of water, under pressure, into the cylinder 43 above the head 42 upon opening of the valve 49. The pipe 60 leads to an intake port or branch 67 provided upon the closure head 68 of the cylinder 44, and at this point, it will be understood that the supply of water, under pressure, delivered to the cylinder 44 may be controlled by manipulation of the valve 50. In order that the water may be drained from the cylinders 29 and 43, at a period in the operation of the apparatus, which will presently be set forth, drain pipes 69 and 70 are connected with the casings of the valves 49 and 50 respectively and led therefrom to any desired point of delivery.

The tube 59 is led to an intake port 71 provided upon the closure head 43 for the cylinder 29, and it will be evident that, by manipulating the valve 49, the flow of water under pressure through the tube 59 to this cylinder may be controlled simultaneously with the flow of water, under pressure, through the tube 61 to the cylinder 43.

In order to brace the head 28 at the lower end of the cylinder 29, a brace 72 is secured at its ends to the frame structure 1 and is of substantially U-shape and provided, midway between its ends with a substantially semi-circular head 73 which bears against the rear side of the coupling member 28, which constitutes the lower head of the cylinder 29, and in order that the downward movement of the piston 30 of the cylinder 29 may be limited, a head 74 is threaded into the coupling 28 and is provided, upon its upper side with an upstanding stem 75 against which the piston head may abut when the piston is at the limit of its downward movement. Within the cylinder 44 there is mounted a piston, the head of which is indicated by the numeral 76, and the stem of this piston, indicated by the numeral 77, extends downwardly through a tubular extension 78 at the closed lower end of the cylinder, and the said end of the cylinder is provided, within the cylinder, with an upstanding tubular part 79 which constitutes an abutment for the head 76, a compression spring 80 being arranged about the piston rod 17 and about the abutment 79 and bearing at its lower end against the closed lower end of the cylinder 44, and at its upper end against the side of the head 76.

In order that the unit of the apparatus which is to coact with the mold form in which the pipe is molded, to elevate the form from the pipe after the concrete has set, it is necessary that the cylinders 43 and 44 be capable of upward movement and, in order that this may be accomplished and the said lifting unit be relatively braced as well as the mold form, means is provided which will now be described. The numeral 81 indicates a spider which is secured to the lower end of the piston rod 77 and the arms 82 of which extend outwardly with respect to the axis of the said rod have their outer ends flattened as indicated by the numeral 83 so as to engage securely against the upper end of the molded pipe section. In order to provide for upward movement of the mold form, upon upward movement of the cylinders 43 and 44, hanger bars 84 are suspended from the tubular arms 85, which may constitute pipe sections, fitted into and extending from a four-branch coupling 86 mounted upon the closed bottom of the cylinder 43, and these hanger bars are provided at their lower ends, each with a hook, indicated by the numeral 87, these hooks being engageable with studs 88 which it is customary to form or provide upon the pipe form which is shown in dotted lines in Figures 1 and 4, and indicated by the numeral 89. At this point it will be observed and particularly by reference to Figure 1 that the said closed bottom of the cylinder 43 is formed with a vent opening, indicated by the numeral 90, inasmuch as no pressure is to be exerted against the under side of the piston head 42 but only against the upper side of said head upon the admission of water, under pressure.

Hanger arms 84 are braced, at their hooked lower ends by brace arms 91 and are secured at their forward ends, each to a respective one of the hanger arms 84, and these arms 91 are connected at their rear ends to a collar 92 which is clamped by bolts 93, upon a stem 94, which is connected by a welded branch 95 with a sleeve 96 which is slidably movable upon the upright 12, and rollers 97 are arranged in an annular series at the upper and lower ends of the said sleeve 96 and ride against the upright 12 so as to provide for uniform upward and downward movement of the sleeve. In order that the mold form 89 may be braced against lateral displacement as it is being drawn upwardly, a stabilizer indicated in general by the numeral 98 is provided and the same comprises a threaded stem 99, one end of which is fitted in the lower end of the stem 94, and has threaded thereon a nut 100, another nut 101 being likewise threaded onto the stem near the other end thereof, and a compression spring 102 being arranged upon the stem and bearing between the nut 99 and the lower end of the stem 49. The forward end of the threaded stem 99 is provided with outwardly diverging fingers 103 which are adapted to engage against the rear side of the mold form and thus, due to the pressure exerted by the spring 103, which spring is regulated by adjusting the nut 101, stabilizing the form as it is being elevated.

In order that the sleeve 96 may be prevented from rotating about the upright 12 and guided and steadied in its up and down sliding movement, a head 104 is fixed upon the sleeve 96 between the upper and lower ends thereof, and brackets 105 are mounted upon the rearward extension of this head and the said head is recessed so as to straddle the upright 22, and the grooved rollers 106 are mounted in the brackets and are in peripheral contact with the opposite sides of the said upright.

From the foregoing description of this embodiment of the invention, it will now be understood that when the valves 49 and 50 are opened, water under pressure will be admitted to the cylinders 29, 43 and 44, thus causing downward movement of the piston 30 in the cylinder 29, and a consequent downward pull upon the chain 34 and this will, of course, result in an upward pull on that stretch of the chain which is connected to the piston rod 41 and as the piston is at this moment at the upper limit of its movement and in engagement with the head 66 of the cylinder 43, and the bottom of this cylinder is connected by the coupling 86 with the head 68 of the cylinder 44, the pressure of the water under pressure entering the cylinders 43 and 44 will simultaneously tend to move the cylinders 43 and 44 upwardly with respect to their respective pistons and, at the same time, the upward pull exerted upon the stretch of the chain 34 by the downward movement of the piston 30 will tend to move the pistons upwardly and therefore the combined efforts will result in an upward movement of the hanger arms 84, and the upward sliding movement of the mold form from the molded pipe section. The downward pressure of the compressed air upon the piston head 76 will of course, exert a corresponding pressure upon the spider arms 84 and therefore the molded form will be loosened from the molded pipe section, thus permitting the mold form to move upwardly and away from the molded section. It will be understood of course that by adjusting the valves 49 and 50 to the proper position, the water which has been under pressure in the cylinders 43 and 44 may be led off from the drain pipes 69 and 70, and this will permit the mold form to reassume its lowered position as well as the parts associated with it and supporting and bracing the same.

From the foregoing description of the embodiment of the invention shown in Figures 1 to 4 inclusive, it will be evident that this embodiment is designed primarily for use in stripping the mold form from the molded pipe section and in order that the apparatus, embodying the invention, may be put to further use in the handling of molded pipe sections, the structure disclosed in the first mentioned figures may be modified in the manner illustrated in Figures 5 and 6 of the drawings and in these figures the parts which correspond to those shown for example in Figure 1 of the drawings, are indicated by like reference numerals, primed. In the embodiment shown in Figures 5 and 6, the chain 34 is disengaged from the pulleys 35 and 38 and the entire length of chain is substituted therefor, this chain being indicated in Figure 5 by the numeral 107 and being connected at the end of its stretch which is suspended from the crank to the rod 108 of a piston head 109 which works in a cylinder 110 provided at its upper end with a head 111 through which the piston rod 108 extends, and a tube 112 corresponding to the tube 60, being connected with an endless port extension 113 upon the head 111. The lower end of the cylinder 110 is closed by a head 114 and a chain 115 is connected at its upper end to a pin 116 secured centrally in the head 114, the lower end of this chain being connected to a yoke 117 which straddles and is pivotally connected as at 118 to a toggle bar 119, which is preferably of wood and of a length slightly greater than the interior diameter of the molded pipe section to be lifted, which section is indicated by the numeral 120.

It will be observed that the yoke 117 is located close to one end of the said bar so that when the bar is introduced into the finished or molded pipe section, it, because of its length, must assume an oblique position, as shown in Figure 5 and, when water under pressure is admitted into the cylinder 110 by way of the tube 112, downward pressure will be exerted upon the piston head 109, thus effecting elevation of the cylinder 110, and an upward pull upon the chain 115 to cause the toggle bar to bind within the pipe section. In this embodiment, an extension of the crank arm 15′, indicated by the numeral 12′ is provided at its inner end with a head 122 which fits the housing 39′ of the crank arm 15′, and a brace 123 is welded at its upper end as at 124 to the outer portion of the extension 121, and at its lower end is provided with a stud 125 which projects beyond the lower end of the bars which end is beveled to seat against the upright 12′ and engages in a socket 126 formed in said upright 12′. A housing 127 is formed at the outer end of the crank arm extension 121 and corresponds to the housing 39, and a pulley 128 corresponding to the pulley 38 is mounted in this housing, and the chain 107 is threaded thereover. Crank arms 129 are suspended from the head 122 at the opposite sides thereof and a pulley 130 is mounted between these arms.

The other end of this tube 112 is connected by an elbow 131 to one branch of a T-coupling 132, this coupling being connected by a nipple 133 with the three-way valve casing 134 which is mounted upon the upper end of the stem 94′ and controlled by a handle 135. To an oppositely extending elbow 136 there is connected the pipe 59′ which communicates with the cylinder 29′ by way of the top head 32′ of said cylinder to a flexible tube 137 and is connected to another branch of the three-way valve casing 134 and led from the pulley 62′ and this tube corresponding to the tube 60 of the previously described embodiment, another tube 138 being connected with another branch of the three-way valve casing 134 and corresponding to the tube 59 of the previously described embodiment, and these tubes corresponding to the tubes 59 and 60, respectively, shown in Figure 3 heretofore described or, if desired, these tubes 137 and 138 may be connected with a single source of water under pressure due to the use of a three-way valve.

From the foregoing description of the embodiment of the invention shown in Figures 5 and 6, it will be understood that by manipulating the valve 135, water under pressure may be delivered to the cylinder 110 to cause elevation of the cylinder with respect to the piston head 109, and water may be likewise delivered into the cylinder 29′ to cause downward movement of the piston in this cylinder to exert a pull on the chain 107, thereby tensioning the chain 115 to cause the toggle bar 119 to have binding engagement within the pipe section 120 and also effect lifting of the said pipe section.

Figure 7 of the drawings illustrates an arrangement whereby two toggle bars, indicated by the numeral 139 may be provided instead of the single toggle bar 119, and the chain which is indicated by the numeral 140, corresponding to the chain 115, is provided with two branches 141, each connected to a respective one of the toggle arms, this embodiment being preferably employed where the molded pipe sections are of considerable diameter and weight.

Figures 8, 9 and 10 of the drawings, illustrate a modification of the invention in which the mold form, which is provided with eccentric locking levers 142, may be automatically opened to permit the form to expand and thus being freely disengaged from the molded pipe section, and these eccentric levers are mounted upon a rod 143 at one side of the split form, and a lever arm 144 is mounted at the upper end of the said shaft.

A cylinder 145 is slidably mounted upon its piston 146, the stem of which piston is supported pivotally upon the lower end of a bracket arm 147 which is provided at its upper end with a collar 148 clamped about a supporting arm 149 constituting the equivalent of one of the arms 85 of the first described embodiment of the invention. An arm 150 is fixed to the inner end of the cylinder 145 and therefore movable with the cylinder when pressure is admitted into the outer end of the cylinder thru a flexible hose 151, this hose leading from the head 152 of a cylinder 153, which cylinder corresponds to the cylinder 44 of the first described embodiment.

The arm 150 is provided with a pair of depending spaced fingers 154, and these fingers straddle the lever 144 so that when the cylinder 143 is forced outwardly by the admission of air under pressure behind its piston 146, against the tension of tension springs 155, which are connected at their outer ends to the outer cylinder heads and at their inner ends to an arm 155', pivotally mounted between its ends upon a bracket 155a suspended from one of the arms which correspond to the arms 85 of the first described form, the connection of one spring with one end of the arm being fixed with respect to the pivoted arm 151 and the end of the other spring 155 being interchangeably engageable in perforations 155b formed in the entire end of said arm 155'. The lever 144 will be swung outwardly so as to swing the cam levers 142 and permit the mold form to expand. A valve 156 is mounted at the outer end of the cylinder 145 and is adjustable to control the water under pressure entering the cylinder through the flexible hose 151. Tension springs 157 are connected at their upper ends to hooks 158 provided upon the lower end of the coupling head 152, and these springs are connected at their lower ends to the arms 159 of a spider 160 corresponding to the arms 82 of the spider 81 of the first described embodiment of the invention, the spider 160 being of course mounted upon the stem 161 of a piston head 162 which is slidably mounted in the cylinder 153.

A flexible hose 163 communicates with the coupling head 148, and supply water under pressure is delivered to the cylinder 163 above the piston head 162, and corresponds to the hose 60 of the first described embodiment, and a hose 164 corresponding to the hose 161 is connected to the upper end of a cylinder 165 corresponding to the cylinder 43, the piston, 166, which corresponds to the piston 42 of the first described embodiment, and the piston 162, functions in the same manner as in the first described embodiment.

It will be observed by reference to Figure 10 of the drawings that when water under pressure is admitted into the cylinder 145 and the cylinder is shifted with respect to its piston and piston stem, the piston stem which is also pivoted to the arm 155a, will swing about this pivot, with the cylinder, to assume the dotted line position shown in Figure 10, and a pull will therefore be exerted upon the lever arm 144 to rotate the shaft 143 upon which the cam levers 142 are fixed, thus actuating said levers to release the mold form for expansion.

What I claim is:—

1. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure, into said cylinder to effect downward movement of the piston and a pull upon the flexible element to elevate the mold form with respect to the pipe molded therein and a spider connected with the piston and adapted to enter the mold and bear upon the end edge of the pipe therein.

2. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure, into said cylinder to effect downward movement of the piston and a pull upon the flexible element to elevate the mold form with respect to the pipe molded therein, means engageable with the molded pipe to restrain the same from upward movement with the form when the form is elevated and a spider connected with the piston and adapted to enter the mold and bear upon the end edge of the pipe therein.

3. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure, into said cylinder to effect downward movement of the piston and a pull upon the flexible element to elevate the mold form with respect to the pipe molded therein, and means engageable with the molded pipe to restrain the same from upward movement with the form when the form is elevated, the said means comprising a cylinder, a piston working in the cylinder, means for supplying a fluid under pressure to the cylinder simultaneously with the supply of fluid under pressure to the first mentioned cylinder, and a spider upon the stem of the said piston including arms radiating therefrom and having terminal portions to engage the upper end of the molded pipe form to expand the same and free the same from the molded pipe during the period of elevation of the molded pipe.

4. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure into said cylinder to effect downward movement of the piston and a pull upon the flexible element to elevate the mold form with respect to the pipe molded therein, means for guiding the mold form in its upward movement and a spider connected with the piston and adapted to enter the mold and bear upon the end edge of the pipe therein.

5. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure, into said cylinder to effect downward movement of the piston and a pull upon the flexible element to elevate the mold form with respect to the pipe molded therein, the lifting unit comprising arms having hooked ends engaging studs upon the mold form and a spider connected with the piston and adapted to enter the mold and bear upon the end edge of the pipe therein.

6. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure, into said cylinder to effect downward movement of the piston and a pull upon the flexible element to elevate the mold form with respect to the pipe molded therein, the lifting unit comprising arms having hooked ends engaging studs upon the mold form, the said crane including an upright standard, a member slidable upon the standard, arms extending therefrom and connected with the said hooked ends of the arms of the said unit and a spider connected with the piston and adapted to enter the mold and bear upon the end edge of the pipe therein.

7. In a pipe mold form stripper, a frame structure, a crane mounted thereon, a cylinder mounted upon the said frame, a piston working in the cylinder, a pipe mold form, a lifting unit engaging said form, a flexible element connected with the piston and with the lifting unit, means for admitting a fluid, under pressure, into said cylinder to effect downward movement of the piston and a pull upon the flexible element to elevate the mold form with respect to the pipe molded therein, the lifting unit comprising arms having hooked ends engaging studs upon the mold form, the said crane including an upright standard, a member slidable upon the standard, arms extending therefrom and connected with the said hooked ends of the arms of the said unit, and a yieldable brace also movable with the said sleeve and engaging one side of the mold form to guide and steady the mold form.

8. In a pipe mold form stripper, a frame structure, a crane mounted thereon, a cylinder mounted on the said frame, a piston working in the cylinder, a pipe mold form, a lifting unit for lifting the mold form from the molded pipe, the said lifting unit comprising a cylinder, a piston working therein, means for supplying a fluid under pressure to the cylinder above the piston, a flexible element connected with the piston, first mentioned, and to the last mentioned piston, means upon the crane for guiding said flexible element, a second cylinder arranged below the second mentioned cylinder and fixed with respect thereto, a piston working therein, a spring holding the piston normally in elevated position in said cylinder, and means for admitting fluid under pressure to the upper end of the last mentioned cylinder, whereby the admission of fluid under pressure to the first mentioned cylinder will exert a pull upon the flexible connection, upward movement of the second mentioned cylinder with respect to its piston, an upward movement of the third mentioned cylinder with respect to its piston against the tension of the spring, the lifting unit being movable with the second and third mentioned cylinders.

9. In a pipe mold form stripper, a frame structure, a crane mounted thereon, a cylinder mounted on the said frame, a piston working in the cylinder, a pipe mold form, a lifting unit for lifting the mold form from the molded pipe, the said lifting unit comprising a cylinder, a piston working therein, means for supplying a fluid under pressure to the cylinder above the piston, a flexible element connected with the piston, first mentioned, and to the last mentioned piston, means upon the crane for guiding said flexible element, a second cylinder arranged below the second mentioned cylinder and fixed with respect thereto, a piston working therein, a spring holding the piston normally in elevated position in said cylinder, means for admitting fluid under pressure to the upper end of the last mentioned cylinder, whereby the admission of fluid under pressure to the first mentioned cylinder will exert a pull upon the flexible connection, upward movement of the second mentioned cylinder with respect to its piston, an upward movement of the third mentioned cylinder with respect to its piston against the tension of the spring, the lifting unit being movable with the second and third mentioned cylinders, and means engageable with the molded pipe to restrain the same from upward movement with the form when the form is elevated, said means being supported by the piston of the third mentioned cylinder.

10. In a pipe molding machine of the class described, the combination with a split mold form, means connected with the same, at opposite sides of its line of division, and adjustable to close and open the form, respectively before and after molding of a pipe therein, the said means including an operating lever, of a cylinder mounted at one side of the form and opposite the said lever, a piston in the cylinder including a rod having operative engagement with the lever, means for admitting a fluid under pressure into said cylinder to effect movement of the piston in a direction to actuate the lever to effect opening of the form and a spider connected with the piston and adapted to enter the mold and bear upon the end edge of the pipe therein.

11. In a pipe molding and stripping machine of the class described, the combination with a split mold form, means connected with the same at opposite sides of its line of division and adjustable to open and close the form respectively, before and after molding of a pipe therein, a cylinder, a piston working therein, a unit for connection with the form, means for admitting the fluid under pressure into the cylinder, and a flexible element connected with the rod of the said piston and having connection with the unit fixed with respect to the form, whereby, upon admission of fluid under pressure into the cylinder, the flexible element will be tensioned to effect lifting of the form, of a cylinder mounted at one side of the form and opposite the said lever, a piston in the cylinder including a rod having operative engagement with the lever, and means for admitting a fluid under pressure into said cylinder to effect movement of the piston in a direction to actuate the lever to effect opening of the form.

In testimony whereof I affix my signature.

GUS ALMQUIST.